United States Patent [19]

Staaden

[11] Patent Number: 5,726,917
[45] Date of Patent: Mar. 10, 1998

[54] METHOD FOR CONTROLLING A COORDINATE MEASURING APPARATUS

[75] Inventor: Ulrich Staaden, Aalen, Germany

[73] Assignee: Carl-Zeiss-Stiftung, Heidenheim, Germany

[21] Appl. No.: 693,632

[22] Filed: Aug. 9, 1996

[30] Foreign Application Priority Data

Aug. 11, 1995 [DE] Germany ............. 195 29 547.1

[51] Int. Cl.⁶ .................. G05B 19/19; G05B 19/4093
[52] U.S. Cl. ............... 364/560; 364/559; 364/474.27; 33/503; 33/504
[58] Field of Search ................... 364/559, 560, 364/564, 474.05, 474.01, 474.37, 130, 136, 468.01, 468.24, 474.27; 33/503, 504, 1 R, 1 M, 505, 551, 554, 700; 395/141, 119

[56] References Cited

U.S. PATENT DOCUMENTS

| | | | |
|---|---|---|---|
| 4,769,763 | 9/1988 | Trieb et al. | 364/559 |
| 4,835,718 | 5/1989 | Breyer et al. | 364/560 |
| 4,866,643 | 9/1989 | Dutler | 364/571.02 |
| 5,016,199 | 5/1991 | McMurtry et al. | 364/560 |
| 5,018,278 | 5/1991 | Aehnelt et al. | 33/559 |
| 5,334,918 | 8/1994 | McMurtry et al. | 364/560 |
| 5,434,803 | 7/1995 | Yoshida | 364/560 |
| 5,471,406 | 11/1995 | Breyer et al. | 364/559 |
| 5,491,638 | 2/1996 | Georgi et al. | 364/474.37 |

FOREIGN PATENT DOCUMENTS

| | | |
|---|---|---|
| 0417337 | 3/1991 | European Pat. Off. . |
| 3908844 | 9/1990 | Germany . |

*Primary Examiner*—James P. Trammell
*Assistant Examiner*—Bryan Bui
*Attorney, Agent, or Firm*—Walter Ottesen

[57] ABSTRACT

The invention is directed to a method wherein the probe head of a coordinate measuring apparatus is driven in a controlled manner in accordance with desired data. The control data, which are necessary for the control, are prepared in the computer of the coordinate measuring apparatus as a point sequence (S1 to Sm) from the geometric data (G1 to Gn) as, for example CAD data. These CAD data describe the work profile to be scanned. For this purpose, the computer encodes the speed profile which ensures a jolt-free movement and a measurement time as short as possible by appropriately selecting the spacings between the points (S1 to Sm) of the control data.

16 Claims, 4 Drawing Sheets

METHOD FOR CONTROLLING A COORDINATE MEASURING APPARATUS

FIELD OF THE INVENTION

The invention relates to a method for controlling a coordinate measuring apparatus wherein the probe head of the apparatus is driven in a controlled manner in accordance with desired data.

BACKGROUND OF THE INVENTION

Such a method is disclosed in U.S. Pat. No. 5,471,406. In this known method, the geometric data of geometric elements of the workpiece are transmitted from a computer to the control of the coordinate measuring apparatus. There, the geometric data is transformed into the machine coordinate system and subsequently transmitted to a support point generator in the control which generates the support points to which the probe head of the coordinate measurement apparatus is then control driven. Furthermore, the desired speed at which the workpiece surface is scanned later is transmitted as separate data from the computer to the control.

This procedure is advantageous for simple geometric elements which are essentially to be scanned at a single pregiven speed. However, it is then difficult when complicated workpiece geometries must be scanned and the scanning speed changes continuously, for example, because of changing curvatures of the workpiece surface. In such a case, it is relatively complex to continuously transmit the desired value of the speed anew to the control of the coordinate measuring apparatus and to incorporate the same into the closed-loop control.

SUMMARY OF THE INVENTION

In view of the above, it is an object of the invention to provide a method for controlling coordinate measuring apparatus with the aid of which data as to the speed profile of the scanning movement can be transmitted as rapidly and simply as possible to the control and can there be processed.

This task is solved with the method of the invention which is for controlling a coordinate measuring apparatus for measuring a workpiece surface defined by geometric data (G1 to Gn). The apparatus includes a probe head which is driven in a controlled manner in accordance with desired data. The method of the invention includes the steps of:

(a) processing said geometric data (G1 to Gn) of said workpiece surface by generating control data (S1 to Sm) therefrom in the form of a sequence of points, the spacing between each two mutually adjacent ones of said points defining the desired course of the speed (v(t)) and the desired course of the acceleration (a(t)) and the spacing between each two mutually adjacent ones of said points always being less than a pregiven first value (vmax) and the first derivative of the point spacing at each position being less than a pregiven second value (amax); and, (b) driving said probe head with said control data determined in step (a).

In the method of the invention, the data as to the course of the scanning speed is already contained in a sequence of points which then must subsequently be scanned by the control only in a fixed pulse time. In this way, the complexity of control is reduced which would otherwise have to be expended in order to process the speed data separately to the geometric data. The control can therefore also operate faster.

It is advantageous to process the control data in the computer of the coordinate measuring apparatus and transmit the same in blocks to the control. This has an advantage especially when complicated geometries are to be scanned with a great number of points. The advantage is that the data can already be processed in advance of scanning the workpiece surface offline on the computer of the coordinate measuring apparatus so that the subsequent scanning operation is no longer burdened by these computations.

Advantageously, the spacings of the points are so selected that, for same-time advances from point to point, a jolt-free movement sequence without jumps results in the speed or acceleration profile of the coordinate measuring apparatus. Such a "soft" movement avoids vibrations in the machine assembly and thereby contributes to an increase of the measuring precision.

In this context, the spacings between the points of the point sequence of the control data are so selected that the speed profile defines a continuously differentiable function of the time, preferably a polynome of the third order.

With respect to measurement times as short as possible, it is further advantageous that the speed profile is made up of segments which, on the one hand, correspond to a polynome of higher order and, on the other hand, correspond to a constant value, namely, preferably the maximum speed of the coordinate measuring apparatus.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
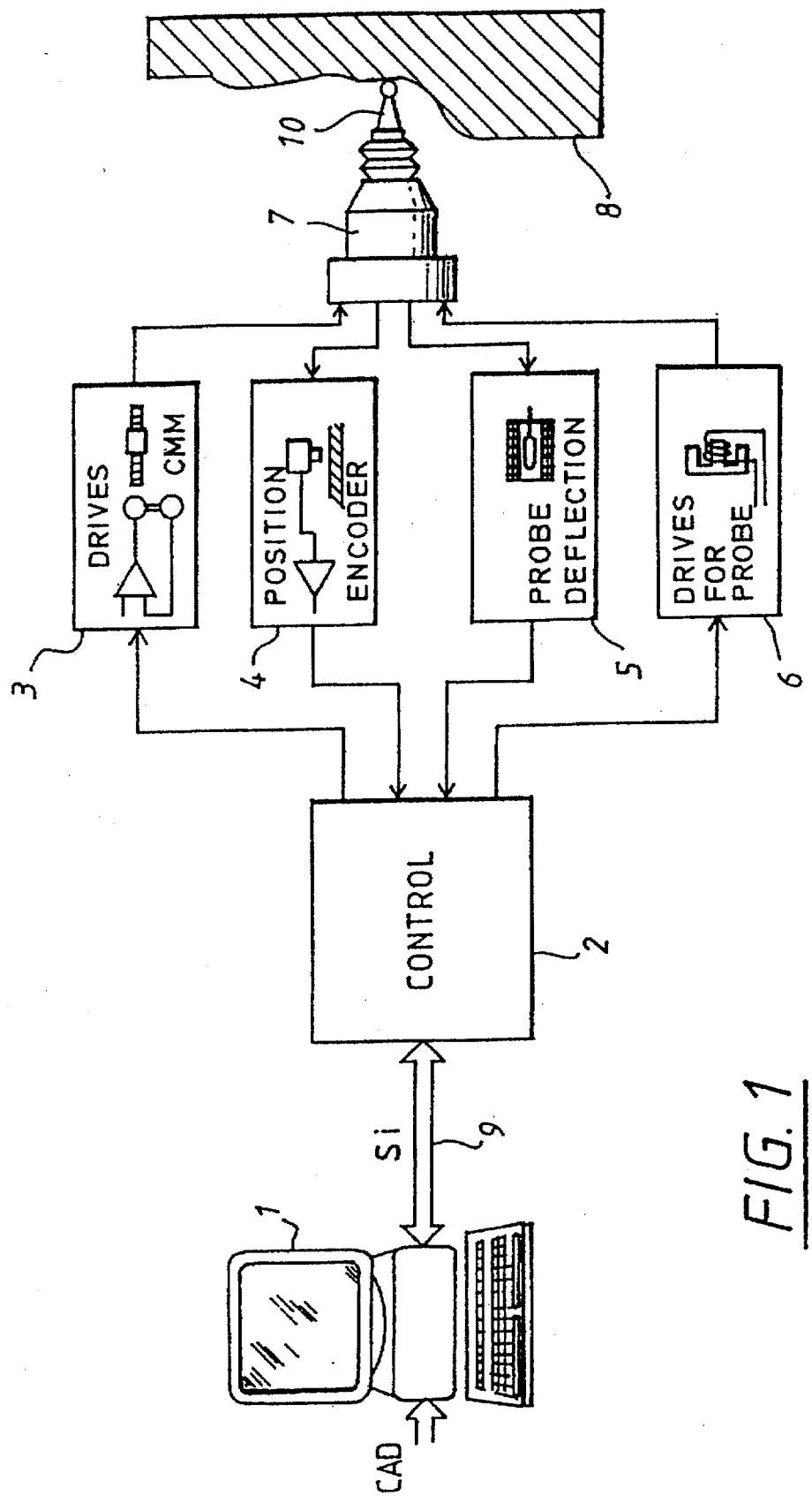
FIG. 1 is a simple schematic block diagram of a coordinate measuring apparatus operating in accordance with the method of the invention.

In FIG. 1, reference numeral 1 identifies the computer of the coordinate measuring apparatus which transmits the control data via a data line 9 to the control 2 of the coordinate measuring apparatus. The control data is processed in a manner which will be described below.

The control 2 is connected to the drives 3 of the measurement carriages of the apparatus. The drives 3 move the probe head 7 along the surface of the workpiece 8 in correspondence to the transmitted data. The control is also connected to the drives 6 in the interior of the probe head via which the probe pin of the probe head 7 can be deflected, more specifically, with the aid of which the measuring force applied to the workpiece 8 can be adjusted. The measuring systems, which measure the deflection of the probe pin 10, are identified by reference numeral 5 and the block 4 indicates the position measuring systems, that is, the scales and encoders via which the position of the probe head 7 is fed back to the control 2.

A complete description of such a control is provided in U.S. Pat. No. 5,471,406 which is incorporated herein by reference.

Geometric data are transmitted to the computer, for example, by a CAD unit (computer-aided-design). This geometric data describes the desired form of the surface of the workpiece 8 to be checked. The CAD data are, as a rule, point data and, for each point, data as to the position of the surface at this point in the form of a normal vector is included.

Figure 2:
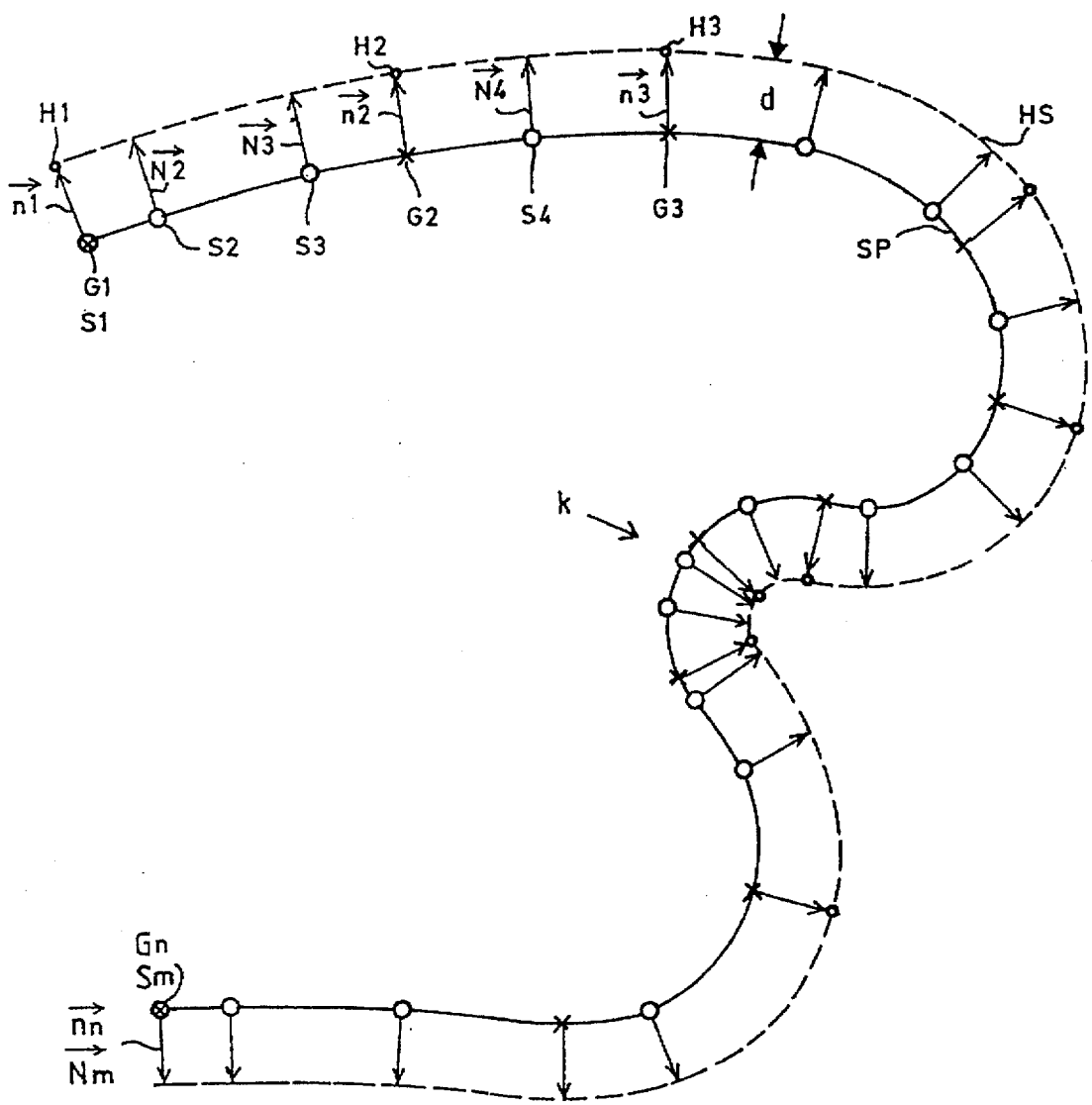
FIG. 2 is a schematic which shows the course of the scanning path on which the probe of the apparatus of FIG. 1 is to move.

Such a set of geometric data is illustrated in FIG. 2. This set of geometric data is shown by crosses (G1, G2, G3, et cetera), which are plotted in correspondence to the coordinates (x, y, z) of these points, together with the normal vectors ($\vec{n}1$, $\vec{n}2$, $\vec{n}3$, et cetera) corresponding thereto. The trace of the contour of the workpiece between these points is unknown.

The data obtained are now processed by the computer 1 for the control 2 in the manner described below.

First, a spline SP, for example a Bezier-Spline is drawn through the points (G1 to Gn). These are functions of the third order and the condition applies that the function values and their first and second derivatives at the support points are coincident. Furthermore, the ends of the spline should have no curvature. Such a spline connects the points (G1 to Gn) of the geometric data but does not follow the exact contour of the workpiece because this contour is not known between the points as mentioned above.

Thereafter, the points (S1 to Sm) are generated in the computer 1 which define the desired data on the basis of which the control 2 controls the probe head 7 on its path along the workpiece surface. It is here assumed that the control later scans the point sequence of the desired data in such a manner that movement from one point to the next is at a fixed machine time sequence of, for example, 10 milliseconds. In this way, the acceleration profile and the speed profile of the coordinate measuring apparatus can be pregiven over the spacings of the points. These profiles are then so selected that the coordinate measuring apparatus moves smoothly along the pregiven path, that is, free of jolts. This is obtained by proceeding in the manner described below.

The assumption is made that the movement of the probe head 7 can be subdivided into three types of movement when working through a measuring task, namely:

(1) an accelerating phase;

(2) a uniform movement at constant speed; and, (3) a decelerating phase.

In order to achieve a continuously differentiable transition of the speed from one type of movement to the next and to avoid jumps in the acceleration profile and in the speed profile (jolt-free operation), the speed is defined as a polynome of the third order so that the following equation applies:

$$v(t) = b_1 t^3 + b_2 t^2 + b_3 t + b_4 \qquad \text{(Eq. 1)}$$

From this, the following is obtained for the acceleration:

$$a(t) = 3b_1 t^2 + 2b_2 t + b_3 \qquad \text{(Eq. 2)}$$

For the path x(t), the following then applies:

$$x(t) = \tfrac{1}{4}b_1 t^4 + \tfrac{1}{3}b_2 t^3 + \tfrac{1}{2}b_3 t^2 + b_4 t + b_5 \qquad \text{(Eq. 3)}$$

The coefficients for these equations result from the boundary conditions. Accordingly, the start point is known when starting from standstill. At this start point, the speed is given by v=0. Furthermore, the acceleration (a) and the speed (v) cannot exceed specific maximum values (amax) and (vmax) which are pregiven for the drives of the coordinate measuring apparatus.

If the function described is applied for the speed profile, then the above teaching permits any desired joining of the types of movement in such a manner that the speed trace is always continuously differentiable, that is, the movement therefore occurs free of jolts.

Figure 3:
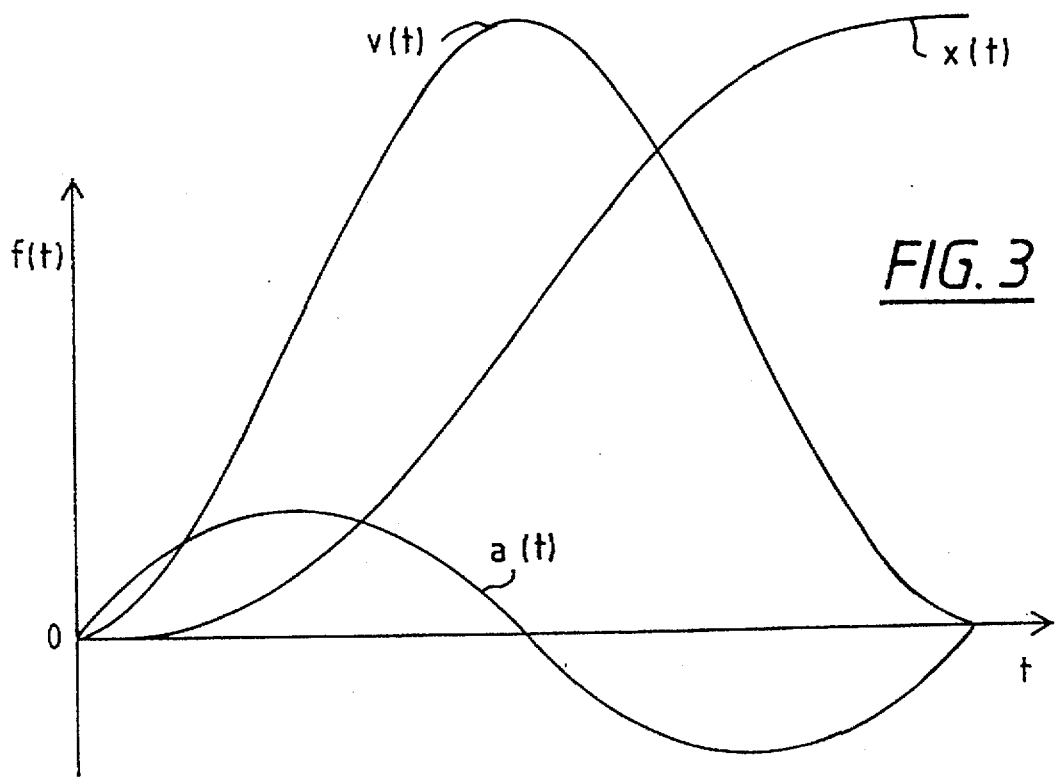
FIGS. 3 and 4 are curves showing the acceleration profile and the speed profile for a coordinate measuring apparatus controlled in accordance with the method of the invention; and, FIG. 5 is a flowchart showing the program steps which are executed in the computer of the apparatus when processing the control data.

FIG. 3 shows the trace of the functions x(t), v(t) and a(t) when, for a very simple case, the movement comprises the acceleration from standstill to a pregiven speed value and thereafter braking to standstill.

Figure 4:
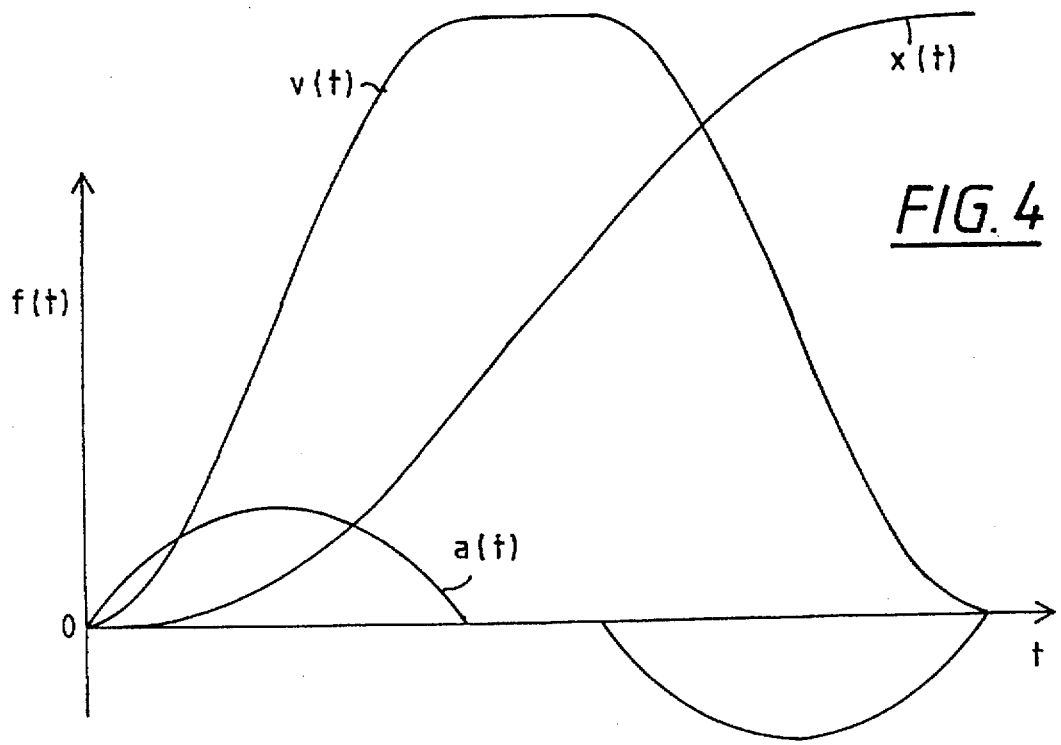

In FIG. 4, the case is shown wherein a movement phase having a uniform speed is inserted between the acceleration phase and the braking phase. This is so because generally it is desired that the coordinate measuring apparatus travels at maximum speed where possible but never exceeds the maximum permissible acceleration. FIG. 4 shows that for this case too, the acceleration has a continuous trace without jumps.

If it would now be necessary to control along a linear scanning path, then the spacings of the desired data would be set on the spline SP (as explained previously with respect to FIG. 2) in correspondence to the speed profile of FIG. 3 or FIG. 4, that is, the speed profile to be traveled by the control would be encoded over the point spacings of the desired points.

For curved paths, the situation is however not so simple. Because of the curve, centrifugal forces perpendicular to the path are generated when passing therethrough and therefore essentially parallel to the surface normal on the surface of the workpiece. The corresponding centrifugal acceleration likewise should not exceed pregiven maximum values. This can only be ensured in that the path speed is correspondingly limited or reduced in dependence upon the radius of curvature at the particular position. Since the following applies to centrifugal acceleration:

$$az = v^2/r \qquad \text{(Eq. 4)},$$

the maximum permitted speed at any particular point (i) on the spline is:

$$v(i) = MIN(vmax, \sqrt{azmax \cdot r}). \qquad \text{(Eq. 5)}$$

In this way, it is possible to generate new points (S1, S2, . . . , Sm) even for curved paths with the aid of equation (5) and the remaining above-mentioned secondary conditions on the spline SP in FIG. 2. The spacings of these new points encode the particular optimal speed course. At locations of greater curvature of the path to be controlled (that is, the position indicated by arrow k in FIG. 2), the newly generated points are correspondingly closer together which means that the probe must there be driven slower in order to hold the centrifugal forces low.

It is furthermore also necessary to interpolate the particular surface normals on the workpiece contour for the newly generated points. Here one proceeds in that a set of auxiliary points (H1, H2, H3, . . . , Hn) is generated from the points (G1, G2, . . . , Gn) for which the following applies:

$$H(i) = G(i) + d \cdot \vec{n}(i) \qquad \text{(Eq. 6)}$$

An auxiliary spline HS can now be drawn through these points as indicated by the broken line in FIG. 2. The ends of the newly computed normal vectors ($\vec{N}1$, $\vec{N}2$, . . . , $\vec{N}m$), which are assigned to the points (S1 to Sm) must then also lie on this auxiliary spline.

With the procedures and secondary conditions described above, the computer 1 can now determine the point sequence of the control data (S1, . . . , Sm) including the normal vectors ($\vec{N}1$ to $\vec{N}m$), which are assigned to these points, from the geometric data (G1 to Gn, $\vec{n}1$ to $\vec{n}n$) which is, for example, obtained from the CAD system. The desired data prepared in this manner are subsequently transmitted to the control 2 (for example, in blocks of 10 points each) at a slower rate of 100 milliseconds required by the bus 9. In the control 2, the blocks of desired data are moved through as described above.

Figure 5:
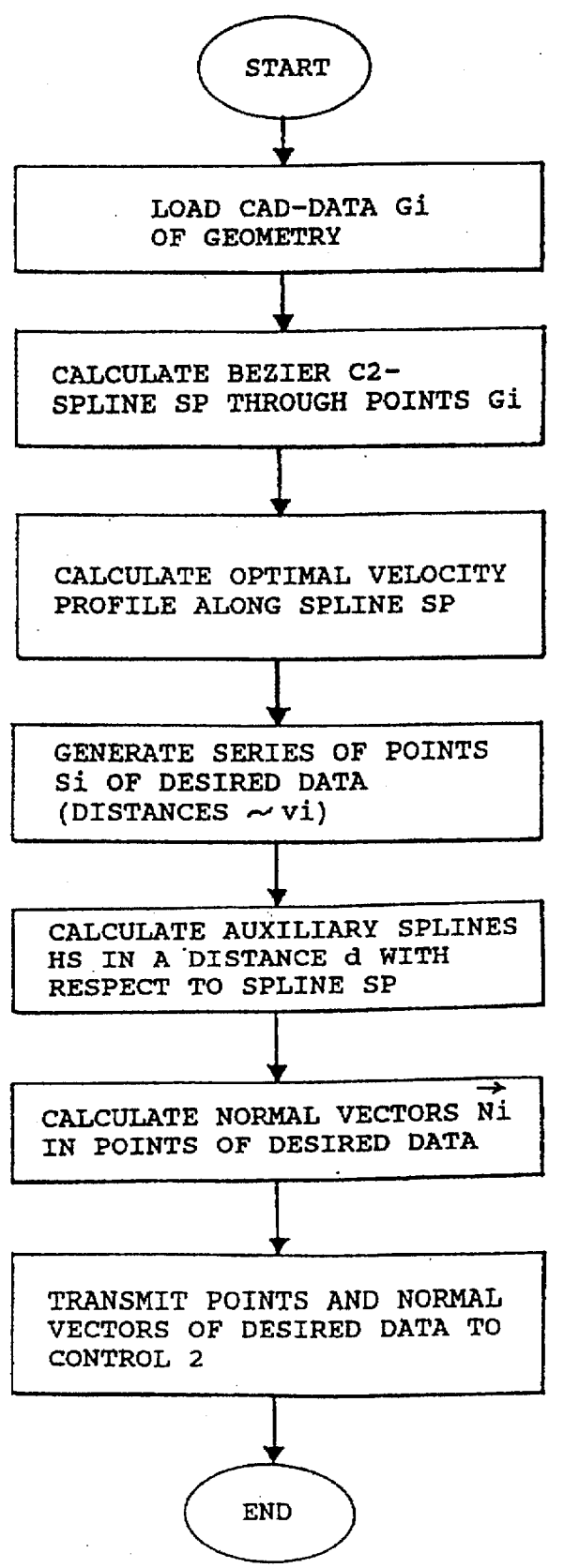

The sequence explained above is again shown in the context of the flowchart of FIG. 5. The control 2 then travels the transmitted points individually at its clock rate $T_1$ of, for example, 10 milliseconds, whereby the movement sequence, which is encoded into the point sequence, is converted into the movement of the probe head 7.

It is understood that the foregoing description is that of the preferred embodiments of the invention and that various changes and modifications may be made thereto without departing from the spirit and scope of the invention as defined in the appended claims.

What is claimed is:

1. A method for controlling a coordinate measuring apparatus for measuring a workpiece surface defined by geometric data (G1 to Gn), the apparatus including a probe head which is driven in a controlled manner in accordance with desired data, the method comprising the steps of:

(a) processing said geometric data (G1 to Gn) of said workpiece surface by generating control data (S1 to Sm) therefrom in the form of a sequence of points, the spacing between each two mutually adjacent ones of said points defining the desired course of the speed (v(t)) and the desired course of the acceleration (a(t)) and the spacing between each two mutually adjacent ones of said points always being less than a pregiven first value (vmax) and the first derivative of the point spacing at each position being less than a pregiven second value (amax) wherein said desired course of the speed (v(t)) defines a speed profile (v(t)) and said desired course of the acceleration (a(t)) defines an acceleration profile (a(t));

(b) selecting the spacings of the points (S1 to Sm) so that, when advancing at even time intervals from one point to the next, a jolt-free course of movement results without jumps in the speed profile (v(t) and without jumps in the acceleration profile (a(t) of said apparatus; and, (c) driving said probe head with said control data determined in steps (a) and (b).

2. The method of claim 1, wherein the processed data points (G1 to Gn) are scanned individually by the control of said apparatus at a fixed clock rate ($T_1$).

3. The method of claim 1, wherein the control data is processed in the computer of said coordinate measuring apparatus and transmitted in blocks of data to the control of said apparatus.

4. The method of claim 1, wherein said spacings are so selected that said speed profile (v(t)) is a continuously differentiable function of time (t).

5. The method of claim 4, wherein said speed profile (v(t)) defines a polynome of the third order.

6. The method of claim 5, wherein said polynome has a constant value in segments thereof; and, said constant value corresponds to the maximum speed (vmax) of said coordinate measuring apparatus.

7. The method of claim 1, wherein, when said points (S1 to Sm) lie on a curved path, the point spacings in travel direction are so selected that the centrifugal forces and centrifugal accelerations do not exceed pregiven values (azmax).

8. The method of claim 1, said geometric data being a first sequence of support points (G1 to Gn) and said method comprising the further steps of:

laying a spline function through the points of said first sequence of support points; and, then generating the second point sequence of said control data as points (S1 to Sm) lying on said spline.

9. The method of claim 8, wherein said geometric data are CAD data which define the workpiece surface in a point-by-point manner; and, said CAD data containing information $\vec{n}_n$ to $\vec{n}n$) as to the surface normals at corresponding ones of said points (G1 to Gn) which relates to the normal vectors ($\vec{n}_1$ to $\vec{n}_n$).

10. A method for controlling a coordinate measuring apparatus for measuring a workpiece surface defined by geometric data (G1 to Gn), the apparatus including a probe head which is driven in a controlled manner in accordance with desired data, the method comprising the steps of:

(a) processing said geometric data (G1 to Gn) of said workpiece surface by generating control data (S1 to Sm) therefrom in the form of a sequence of points, the spacing between each two mutually adjacent ones of said points defining the desired course of the speed (v(t)) and the desired course of the acceleration (a(t)) and the spacing between each two mutually adjacent ones of said points always being less than a pregiven first value (vmax) and the first derivative of the point spacing at each position being less than a pregiven second value (amax);

(b) selecting the spacings of the points (S1 to Sm) so that, when advancing at even time intervals from point to point, neither the permissible maximum value of the speed (vmax) of said coordinate measuring apparatus nor the permissible maximum acceleration (amax) thereof is exceeded; and, (c) driving said probe head with said control data determined in steps (a) and (b).

11. The method of claim 10, wherein, when said points (S1 to Sm) lie on a curved path, the point spacings in travel direction are so selected that the centrifugal forces and centrifugal accelerations do not exceed pregiven values (azmax).

12. The method of claim 10 wherein the processed data points (G1 to Gn) are scanned individually by the control of said apparatus at a fixed clock rate ($T_1$).

13. The method of claim 10, wherein the control data is processed in the computer of said coordinate measuring apparatus and transmitted in blocks of data to the control of said apparatus.

14. The method of claim 10, wherein said desired course of the speed (v(t)) defines a speed profile (v(t)) and said desired course of the acceleration (a(t)) defines an acceleration profile (a(t)); and, the spacings of the points (S1 to Sm) are so selected that, when advancing at even time intervals from one point to the next, a jolt-free course of movement results without jumps in the speed profile (v(t)) and without jumps in the acceleration profile (a(t)) of said apparatus.

15. The method of claim 10, said geometric data being a first sequence of support points (G1 to Gn) and said method comprising the further steps of:

laying a spline function through the points of said first sequence of support points; and, then generating the second point sequence of said control data as points (S1 to Sm) lying on said spline.

16. The method of claim 15, wherein said geometric data are CAD data which define the workpiece surface in a point-by-point manner; and, said CAD data containing information ($\vec{n}1$ to $\vec{n}n$) as to the surface normals at corresponding ones of said points (G1 to Gn).

* * * * *